Oct. 30, 1951  M. A. GARBELL  2,573,562
FLUID-DYNAMIC STABILIZER AND DAMPER
Filed July 16, 1946  3 Sheets-Sheet 1
FIGURE 1
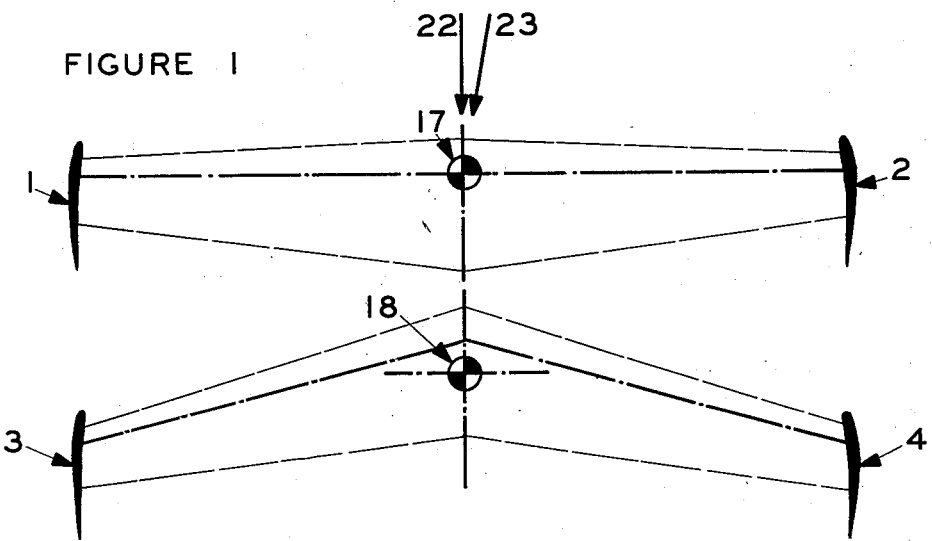
FIGURE 2
FIGURE 3
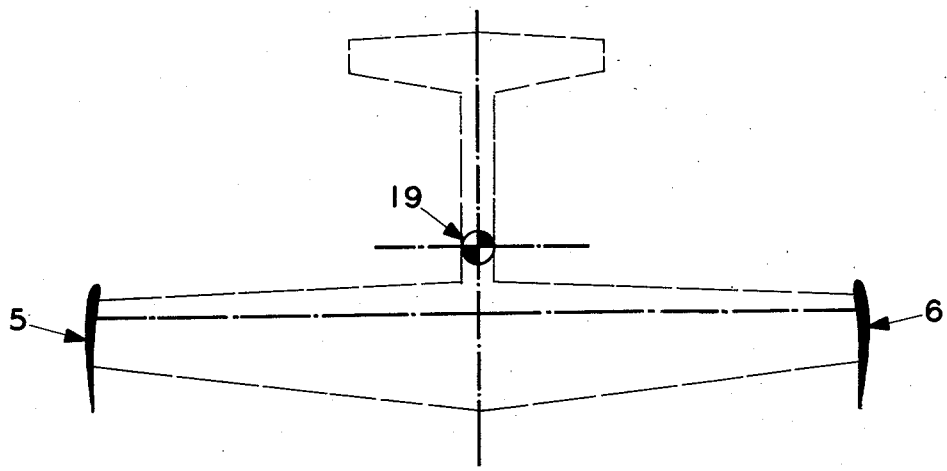
Maurice A. Garbell INVENTOR.
BY
Taylor and Lassagne
ATTORNEYS Oct. 30, 1951     M. A. GARBELL     2,573,562
FLUID-DYNAMIC STABILIZER AND DAMPER
Filed July 16, 1946     3 Sheets-Sheet 2
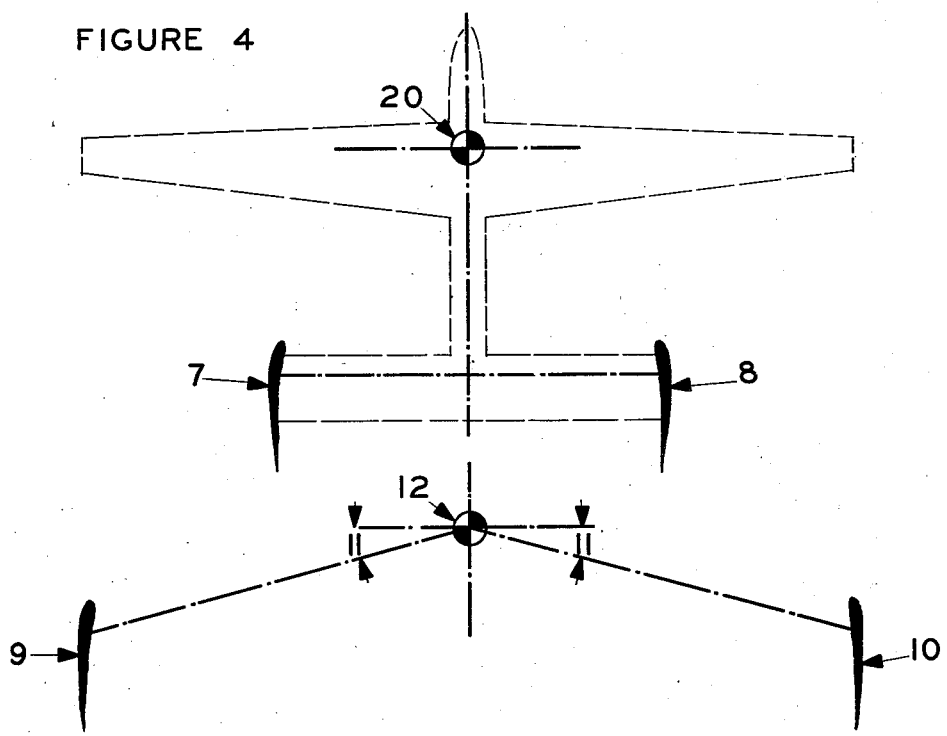
FIGURE 4
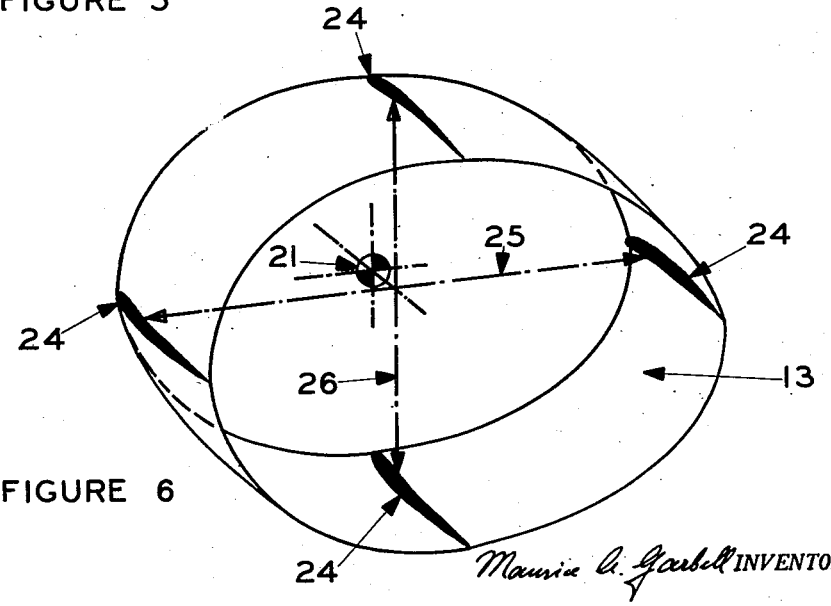
FIGURE 5
FIGURE 6

Patented Oct. 30, 1951

2,573,562

UNITED STATES PATENT OFFICE 2,573,562

FLUID-DYNAMIC STABILIZER AND DAMPER

Maurice Adolph Garbell, San Francisco, Calif., assignor, by direct and mesne assignments, of one-fourth to Maurice A. Garbell, Inc., San Francisco, Calif., a corporation of California, and three-fourths to Garbell Research Foundation, San Francisco, Calif., a corporation of California Application July 16, 1946, Serial No. 683,814

7 Claims. (Cl. 244—91)

This invention pertains to craft, devices, and instruments, hereinafter referred to as "craft," that derive their useful function from their relative velocity with respect to fluids in which they are partially or totally immersed.

In particular this invention pertains to the maintenance of a constant angular setting of said craft with respect to the relative velocity of the fluid, which is hereinafter referred to as "static stability."

This invention also pertains to the creation of a restraint opposing and damping the rotary oscillations of said craft about their respective centers of gravity or rotational hinge lines, which is hereinafter referred to as "rotary damping."

The general object of this invention is the attainment of good static stability and rotary damping characteristics in craft operating in fluids, through the employment of surfaces or bodies hereinafter referred to as "fins," the stabilizing and damping effectiveness of said fins being attributable to the use of fluid-foil sections exhibiting a sharp increase in profile drag for an inwardly acting fin lift and a normal low profile drag for a large range of an outwardly acting fin lift.

Additional objects of this invention appear hereinafter.

Figures 1 and 2 illustrate preferred embodiments of this invention comprising fins designed and constructed according to the method outlined in the subject specification of this invention, as applied to the wing tips of a tailless airplane.

Figure 3 illustrates another embodiment of this invention comprising fins designed and constructed according to the subject method of this invention, as applied to the wing tips of a tail-first airplane.

Figure 4 illustrates another embodiment of this invention comprising fins designed and constructed according to the subject method of this invention, as applied to the tail of an airplane of conventional layout having multiple vertical tail fins.

Figure 5 illustrates another embodiment of this invention comprising a schematic view of fins designed and constructed according to the subject method of this invention, said fin configuration being part of a craft, device, or instrument, such as an anemometer, a yaw meter, a fluid-flow meter, a free-flow hydroturbine, a pair of seaplane floats, etc.

Figure 6 illustrates another embodiment of this invention comprising an annular stabilizer and damper designed and constructed according to the subject method of this invention.

Figure 7:
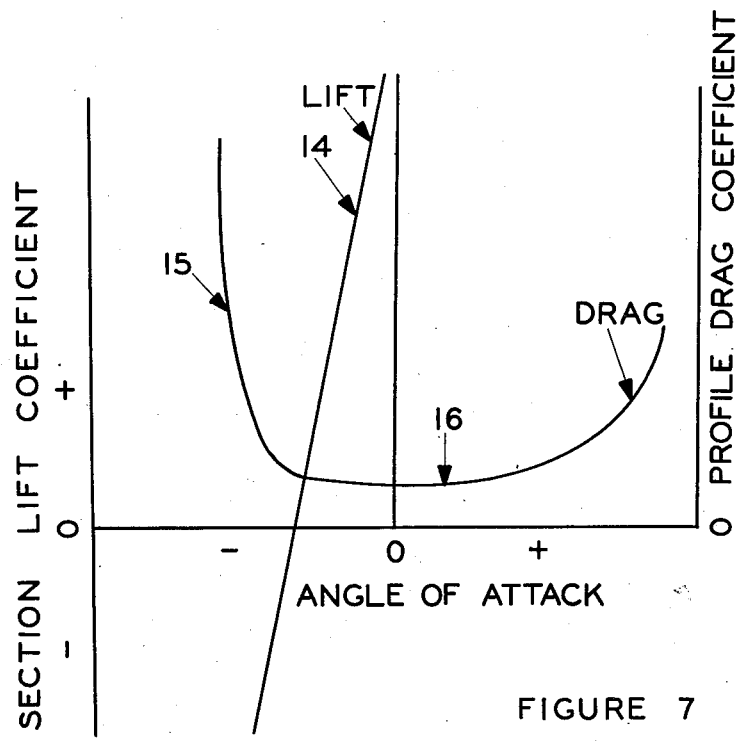

Figure 7 comprises a graph of the lift and profile drag characteristics versus the angle of attack for a typical fluid-foil section as utilized by the subject method of this invention.

Figure 8:
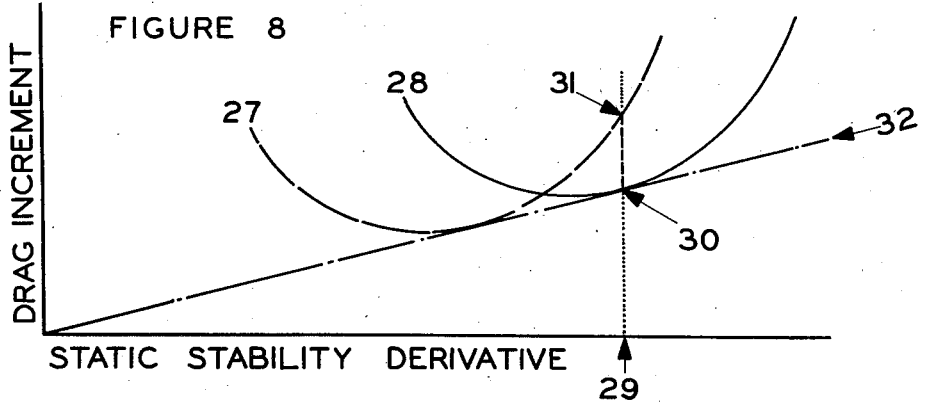

Figure 8 illustrates the method specified by this invention for the selection of the optimum fin size and of the optimum fluid-foil section for the subject fins of this invention.

In the art the achievement of the objects of this invention is recognized as an important step in the advancement of the design and construction of certain craft that operate in fluids having a relative motion with respect to said craft.

At the present state of the art the maintenance of a given constant angular setting or attitude of a craft with respect to the relative velocity of the fluid, known in the art as "static stability," and the restraint and extinction of rotary angular velocities of the craft, known in the art as "rotary damping," are commonly achieved by the use of fins placed at an adequate fore-and-aft arm with respect to the center of gravity or the rotational suspension hinge of the craft. Both the stabilizing action and the damping action of such fins are produced by the moment of their fluid-dynamic lift force with respect to the said center of gravity or the said rotational suspension hinge. In certain craft, however, examples of which are illustrated in Figures 1, 2, 3, 4, 5, and 6, the said fore-and-aft arm between the fins, $1, 2, 3, 4, 5, 6, 7, 8, 9, 10$, and $13$ and the respective centers of gravity or rotational hinges $12, 17, 18, 19, 20$, and $21$ is either zero or of small magnitude; at the state of the art prior to this invention adequate static stability and rotary damping could not be attained in such "short" craft except at the cost of a large penalty in profile drag or induced drag.

This invention provides novel methods and combinations of methods described hereinafter all of which are instrumental in producing an efficient low-drag stabilizing and damping device.

A preferred embodiment of this invention is described in the following specification; the broad scope of the invention is expressed in the claims concluding the instant application.

Figures 1, 2, 3, 4, and 5 illustrate preferred embodiments of this invention for fluid-dynamic stabilization and damping in one plane; for example, directional stabilization and damping in a horizontal plane, or pitching stabilization and damping in a vertical plane, wherein the fins $1, 2, 3, 4, 5, 6, 7, 8, 9$, and $10$ are toed in with respect to the direction of the relative fluid flow or wind so that at the desired angular setting or attitude of the craft the fin lift and hence the induced drag of the fins are as close as practicable to zero, said fins having fluid-foil sections that because of their mean-line camber and thickness distribution, as exemplified by N. A. C. A. airfoils 4306, 6506, and numerous other fluid-foil sections, exhibit a sharp profile-drag increase 15 for the one sign of the fin lift 14 and normal low profile drag 16 for the opposite sign of the fin lift 14, for example, a sharp profile-drag increase 15 for negative fin lift 14 and normal low profile drag 16 for positive fin lift 14, or a sharp profile-drag increase 15 for positive lift 14 and normal low profile drag 16 for negative fin lift 14; and said fin fluid-foil sections being so arranged that the sharp increase in profile drag occurs when the relative fluid flow at the respective fin blows inwardly, that is, toward the center of the center of the craft; therefore, when the angular setting or attitude of the craft with respect to the relative velocity of the fluid differs from the desired value represented by vector 22 and assumes a value as illustrated by the relative fluid-flow vector 23, the "leading" fin exhibiting the sharply increased profile drag creates a stabilizing moment that restores the craft to the desired angular setting or attitude 22.

On craft in which the fins are set at a fore-and-aft arm with respect to the center of gravity or the rotational hinge 12, 17, 18, 19, 20, and 21 of the craft, fins designed and constructed according to this invention provide also a substantially increased rotary damping derivative as a result of the sharp drag increase of the leading fin when the craft is engaged in an angular rotation about its center of gravity or rotational hinge. In the schematic drawing of Figure 5 it is therefore understood that the sweep-back angle 11 of the fins may vary between 0° and 90°, and that in the case of 90° sweep-back the two fins are both placed centrally aft of the center of gravity or rotational hinge 12.

When stabilization and damping are to be accomplished in more than one plane such as, for example, combined directional and pitching stabilization and damping, two or more sets of fins designed and constructed according to the subject method of this invention may be set at an angle to each other, or an annular fin 13 may be employed, wherein the fluid-foil sections 24 utilized in said fins have lift and drag characteristics 14, 15, and 16 as specified hereinbefore; in the annular arrangement 13 the respective lengths of the major axis 25 and of the minor axis 26 of the annular fin 13 are made proportional to the stability and damping contribution required in each of the principal planes of angular motion of the craft; the exact front-view planform of the annlar fin 13 may be curvilinear or polygonal, as this consideration is not of consequence in the application of this invention.

The following specification outlines the method employed in selecting the optimum size of the fins designed and constructed according to the subject method of this invention:

For a given fin configuration the static stability can be made to vary within certain limits by changing the fin toe-in from the aforedescribed setting of zero fin lift at the desired angular attitude of the craft; increase fin toe-in produces generally an increase in static stability and results in a severe drag penalty due to the induced fin drag; fin toe-out produces generally a decrease in static stability and results also in an increment of the induced fin drag. There is an optimum toe-in angle virtually coinciding with the aforementioned value of zero fin lift at the desired angular setting or attitude of the craft, at which the ratio $$\frac{\text{Static stability}}{\text{Drag increment due to fins}}$$

is maximum. Any change of the fin toe-in from the optimum angle results in a reduction of this fin-efficiency criterion. Figure 8 illustrates the variation of static stability derivative versus drag increment for two sets of fins 27 and 28 differing only in size; it is apparent that there is only one optimum fin size 28 that offers the required stability 29 at a minimum drag 30, and that a smaller fin 27 with a greater degree of toe-in provides the same stability at a greater drag increment 31; the subject method of this invention specifies that the optimum size of fins having a given fluid-foil section is determined by interpolating along the line of the greatest stability-versus-drag ratio 32.

The following specification outlines the method employed in selecting the optimum fluid-foil section for fins designed and constructed according to the subject method of this invention.

For a given fin geometry the stability-versus-drag curves for various sizes of the fins 27 and 28 are drawn as exemplified in Figure 7, and the straight line 32 tangent to the curves 27 and 28 is drawn; this procedure is repeated for the various fluid-foil sections that are to be compared for possible use; the shallowest of the resulting straight lines 32, that is, the straight line with the highest stability-versus-drag ratio identifies the fluid-foil section most efficient for use in fins as specified by this invention.

By practicing my invention fluid-dynamic stabilizers and dampers can be designed and constructed to achieve the objects hereinbefore stated.

Numerous tests in wind-tunnels operated by the National Advisory Committee for Aeronautics and leading university laboratories have demonstrated convincingly that each of the objects of this invention, notably good static stability, substantially increased rotary damping, and negligibly low drag increments, have been fully achieved.

The inventor wishes it to be clearly understood that the good static stability and rotary damping characteristics, as well as the extremely low drag, of fin configurations designed and constructed according to the subject method of this invention are directly attributable to the use of fin fluid-foil sections selected according to the hereinbefore specified method of this invention. In particular, it is the utilization of fin fluid-foil sections in which a sharp profile-drag discontinuity coincides with the fin-section angle of attack for zero lift that the inventor wishes to be clearly understood as the principal substance of the instant invention.

This invention accomplishes an important improvement in the art, and the discoveries herein disclosed are of great value to numerous types of aircraft, water craft, and other devices and instruments, particularly wherever the relatively short fore-and-aft dimensions have heretofore rendered exceedingly difficult the attainment of adequate static stability and rotary damping.

I claim:

1. A craft for operating in fluids, means for stabilizing said craft comprising at least one pair of fins arranged at opposite sides of the longitudinal axis of the craft, said fins having a cambered fluid foil section arranged with the concave side thereof directed inboard and characterized by a sharp profile-drag increase when subjected to an angle of attack below that of substantially zero lift and having a normal low profile-drag when subjected to an angle of attack substantially above zero lift, said fins being positioned with respect to said axis at their angle of no lift during normal forward motion of the craft through the fluid, and said fins being laterally spaced with respect to the center of gravity of the craft and being responsive to any deviation of the fins and craft from the angle of attack of no fin lift, toward a negative angle of attack to create a sharp profile-drag increase and thus exert a stabilizing moment about said center of gravity.

2. A craft for operating in fluids, means for stabilizing said craft comprising at least one pair of fins arranged at opposite sides of the longitudinal axis of the craft, said fins having cambered fluid foil sections arranged with the concave sides thereof directed inboards and having a profile characterized by a sharp profile-drag increase at those angular attitudes of the craft at which the relative fluid flow at the respective fin blows inwardly toward the center of the craft, and having a normal low profile-drag at those angular attitudes of the craft at which the relative fluid flow at the respective fin blows outwardly away from the center of the craft, said fins being positioned at substantially their angle of no lift during normal forward flight of the craft, and said fins being laterally spaced with respect to the center of gravity of the craft and being responsive to variations in the relative direction of fluid flow to exert stabilizing moments about said center of gravity.

3. A craft for operating in fluids, means for stabilizing said craft comprising at least one pair of fins arranged at opposite sides of the longitudinal axis of the craft, said fins having cambered fluid foil sections arranged with the concave sides thereof directed inboards and having a profile characterized by a sharp profile-drag increase when subjected to an angle of attack below that of substantially zero lift and having a normal low profile-drag when subjected to an angle of attack substantially above zero lift, said fins being angularly toed-in with respect to said axis an amount such that zero lift will be produced upon said fins during normal forward flight, and said fins being laterally spaced with respect to the center of gravity of the craft and being responsive to variations in the relative direction of fluid flow to exert stabilizing moments about said center of gravity.

4. Fins for craft as set forth in claim 3 wherein the fins form an annular construction.

5. Fins for craft as set forth in claim 4 wherein the major axis and the minor axis, respectively, of the annular construction are proportional to the stability and damping contributions required in each of the two principal planes of angular motion of the craft.

6. A craft for operating in fluids, means for stabilizing said craft comprising at least one annular fin having a fluid foil section cambered inboard and characterized by a sharp profile-drag increase when subjected to an angle of attack below that of substantially zero lift and having a normal low profile-drag when subjected to an angle of attack substantially above zero lift, said fin being spaced from the center of gravity of the craft and positioned concentrically of the longitudinal axis of the craft and at its angle of no lift during normal forward flight of the craft through the fluid to respond to any deviation of the fin and craft from the angle of attack of no fin lift, toward a position where the fluid-foil section is exposed to a negative angle of attack, to create a sharp profile-drag increase and thus exert a stabilizing moment about said center of gravity.

7. A craft for operating in fluids, means for stabilizing said craft comprising a fin construction having at least a pair of fluid foil sections arranged at opposite sides of the center of gravity of the craft, said sections being cambered and arranged with the concave sides thereof directed inboards and having a profile characterized by a sharp profile-drag increase when subjected to an angle of attack below that of substantially zero lift and having a normal low profile-drag when subjected to an angle of attack substantially above zero lift, said sections being angularly toed-in with respect to said axis an amount such that zero lift will be produced upon said fins during normal forward flight, and said sections being laterally spaced with respect to the center of gravity of the craft and being responsive to variations in the relative direction of fluid flow to exert stabilizing moments about said center of gravity.

MAURICE ADOLPH GARBELL.

REFERENCES CITED

The following references are of record in the file of this patent:

UNITED STATES PATENTS

| Number | Name | Date |
|---|---|---|
| 1,495,031 | Muzik | May 20, 1924 |
| 1,600,671 | Hill | Sept. 21, 1926 |
| 2,137,385 | Butler | Nov. 22, 1938 |

FOREIGN PATENTS

| Number | Country | Date |
|---|---|---|
| 425,645 | Great Britain | Mar. 19, 1935 |
| 652,710 | France | Oct. 29, 1928 |

OTHER REFERENCES

"Aircraft Engineering," pages 107–109, April 1945.